United States Patent
White et al.

(10) Patent No.: US 7,040,688 B2
(45) Date of Patent: May 9, 2006

(54) VEHICLE DOOR

(75) Inventors: Tommy E. White, Rochester Hills, MI (US); Adrian B. Chernoff, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 32 days.

(21) Appl. No.: 10/652,881

(22) Filed: Aug. 29, 2003

(65) Prior Publication Data

US 2005/0046227 A1    Mar. 3, 2005

Related U.S. Application Data

(63) Continuation-in-part of application No. 10/426,905, filed on Apr. 29, 2003.

(51) Int. Cl.
*B60J 5/04* (2006.01)

(52) U.S. Cl. .............................. 296/146.6; 296/146.2; 296/187.12; 49/502

(58) Field of Classification Search ............. 296/146.2, 296/146.6, 146.5, 187.12; 49/502
See application file for complete search history.

(56) References Cited

U.S. PATENT DOCUMENTS

| | | | |
|---|---|---|---|
| 3,868,796 A | 3/1975 | Bush | 52/618 |
| 3,964,208 A * | 6/1976 | Renner et al. | 49/502 |
| 4,405,173 A * | 9/1983 | Piano | 296/146.9 |
| 4,845,894 A * | 7/1989 | Herringshaw et al. | 49/502 |
| 5,536,060 A * | 7/1996 | Rashid et al. | 296/146.6 |
| 5,762,394 A * | 6/1998 | Salmonowicz et al. | 296/146.5 |
| 5,924,760 A | 7/1999 | Krajewski et al. | 296/146.6 |
| 5,974,847 A | 11/1999 | Saunders et al. | 72/57 |
| 6,253,588 B1 | 7/2001 | Rashid et al. | 72/57 |
| 6,302,472 B1 * | 10/2001 | Rahmstorf et al. | 296/146.5 |
| 6,805,397 B1 * | 10/2004 | Chernoff et al. | 296/146.2 |

* cited by examiner

*Primary Examiner*—Joseph D. Pape
(74) *Attorney, Agent, or Firm*—Kathryn A. Marra

(57) ABSTRACT

A vehicle door includes an inner panel having strengthening corrugations to function as an impact beam, thereby negating the need for a separate impact beam. The inner panel is preferably characterized by a generally concave shape to increase vehicle interior space compared to prior art doors. A forming technique employing fluid pressure is preferably employed to form the inner panel.

7 Claims, 3 Drawing Sheets

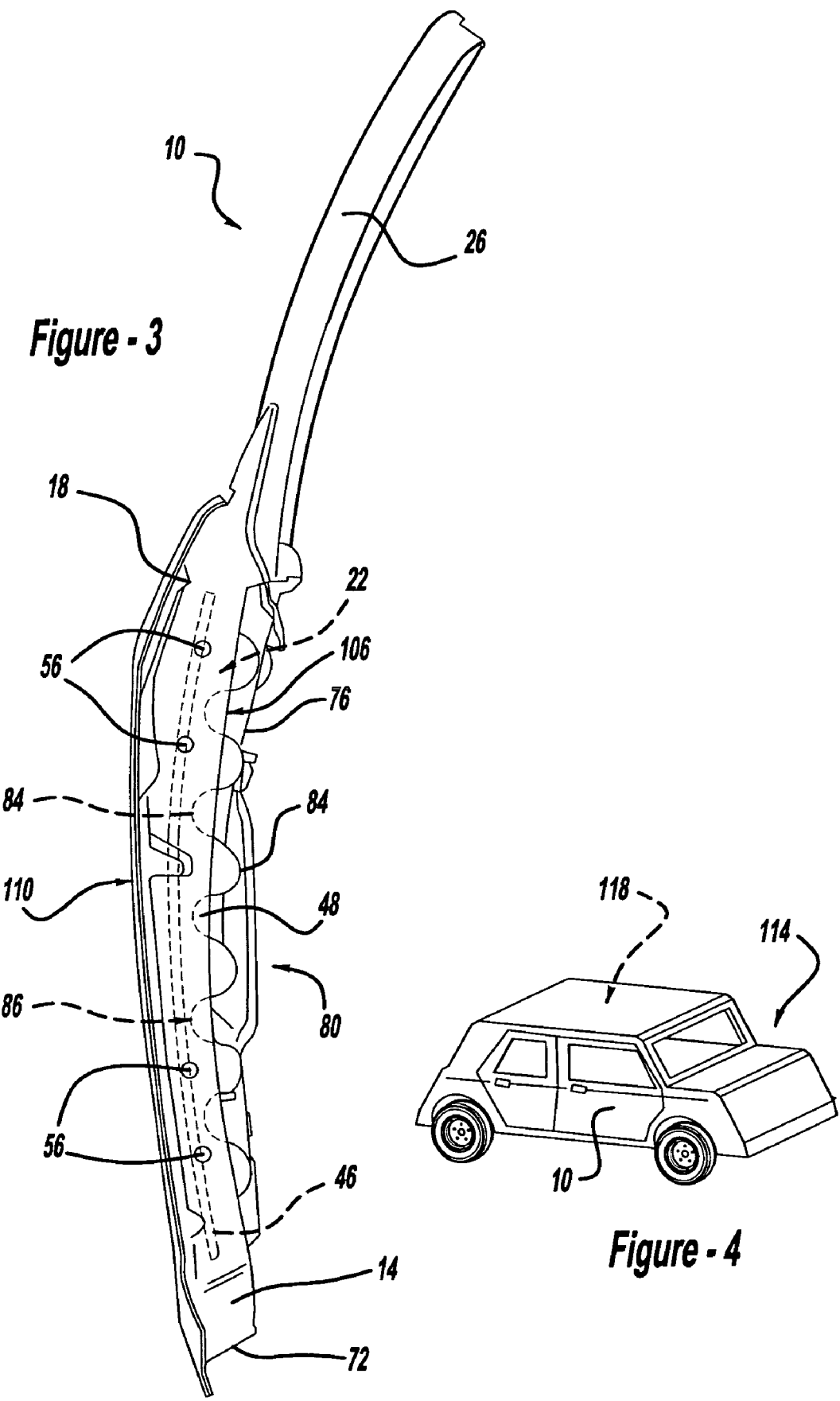

VEHICLE DOOR

CROSS-REFERENCE TO RELATED APPLICATION

This application is a continuation-in-part of U.S. application Ser. No. 10/426,905 filed Apr. 29, 2003, which is hereby incorporated by reference in its entirety.

TECHNICAL FIELD

This invention relates to vehicle doors characterized by an inner panel having strengthening formations thereby to resist deformation in the event of a side impact to a vehicle.

BACKGROUND OF THE INVENTION

Prior art vehicle doors typically employ an inner panel and an outer panel operatively connected to one another to form a cavity therebetween. An impact beam, also sometimes known as an "impact bar," an "intrusion beam," and the like, is located within the cavity to resist deformation of the door in the event of an impact to the side of a vehicle by transferring impact loads to hinges and a door latch. Prior art impact beams exhibit a variety of geometrical configurations, such as high strength steel stampings, tubular bars, etc.

SUMMARY OF THE INVENTION

A vehicle door is provided. The door includes a door outer panel forming at least a portion of the vehicle door's exterior surface. An inner panel is operatively connected to the outer panel to form a door cavity therebetween. The inner panel is characterized by strengthening corrugations for resisting deformation resulting from a side impact.

The inner panel thus acts as an improved impact beam, eliminating a separate impact beam. The invention results in a thinner door compared to the prior art because (1) the door cavity may be smaller because it need not accommodate a separate impact beam, and (2) the elimination of the separate impact beam results in better dimensional control in manufacturing and fewer tolerance stack ups, thereby enabling smaller design clearances between door components.

The door preferably includes a window characterized by a contour and movable between an extended position and a retracted position in which the window is at least partially within the door cavity. At least a portion of the inner panel preferably has a general shape that approximates the contour of the window to further reduce the thickness of the door compared to the prior art. The vehicle door facilitates a more spacious vehicle interior and more vehicle exterior design options.

The door of the invention is lighter in weight than prior art doors because the inner panel eliminates a separate impact beam and because the inner panel is preferably aluminum.

The above features and advantages, and other features and advantages of the present invention are readily apparent from the following detailed description of the best mode for carrying out the invention when taken in connection with the accompanying drawings.

BRIEF DESCRIPTION OF THE DRAWINGS

FIG. 3 is a front schematic view of the door of FIGS. 1 and 2; and

FIG. 4 is a schematic perspective view of a door according to the invention installed as part of a vehicle.

DESCRIPTION OF THE PREFERRED EMBODIMENT

Figure 1:
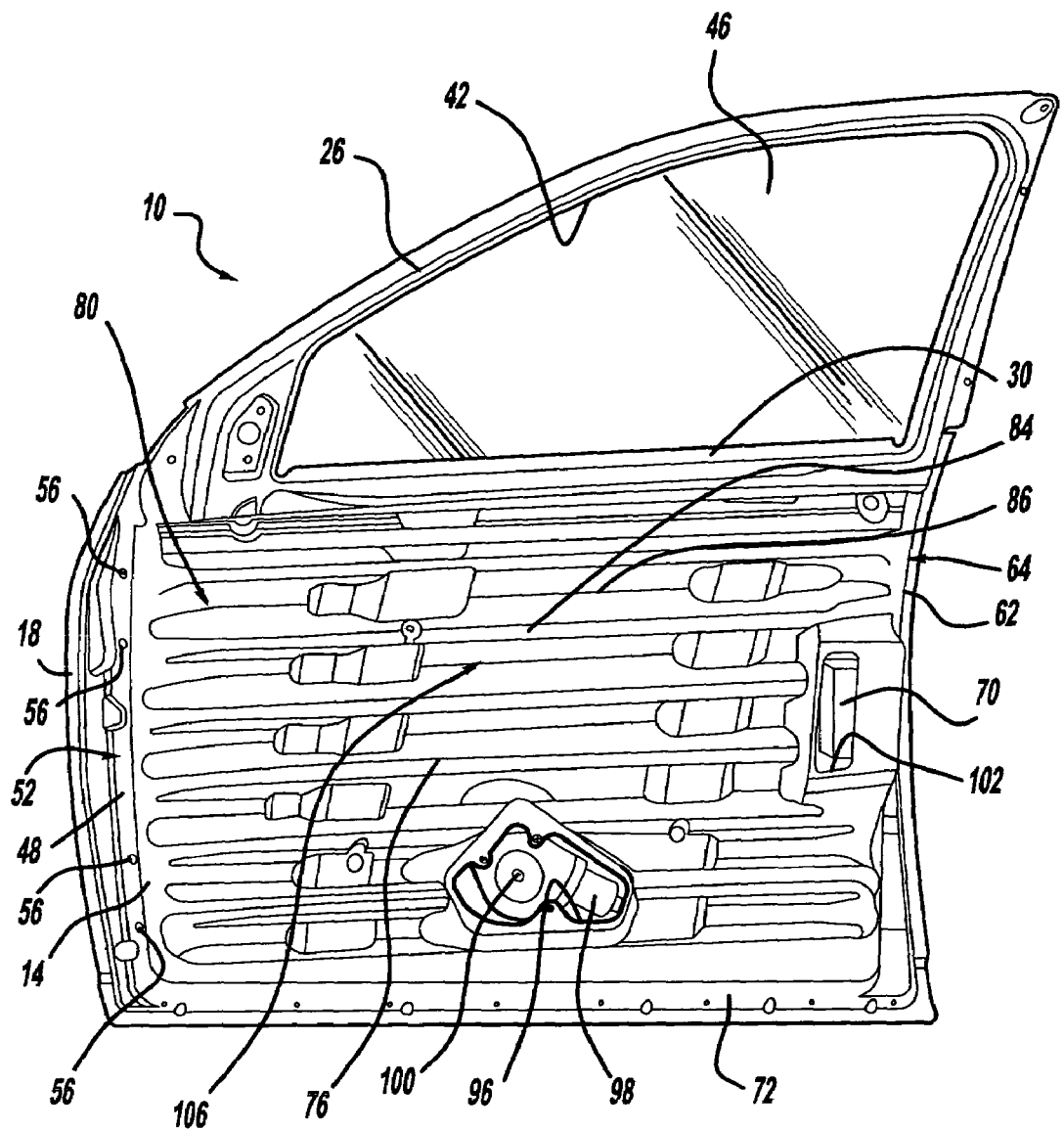
FIG. 1 is a side schematic view of a door having an inner panel characterized by strengthening corrugations as viewed from the interior of a vehicle.
Figure 2:
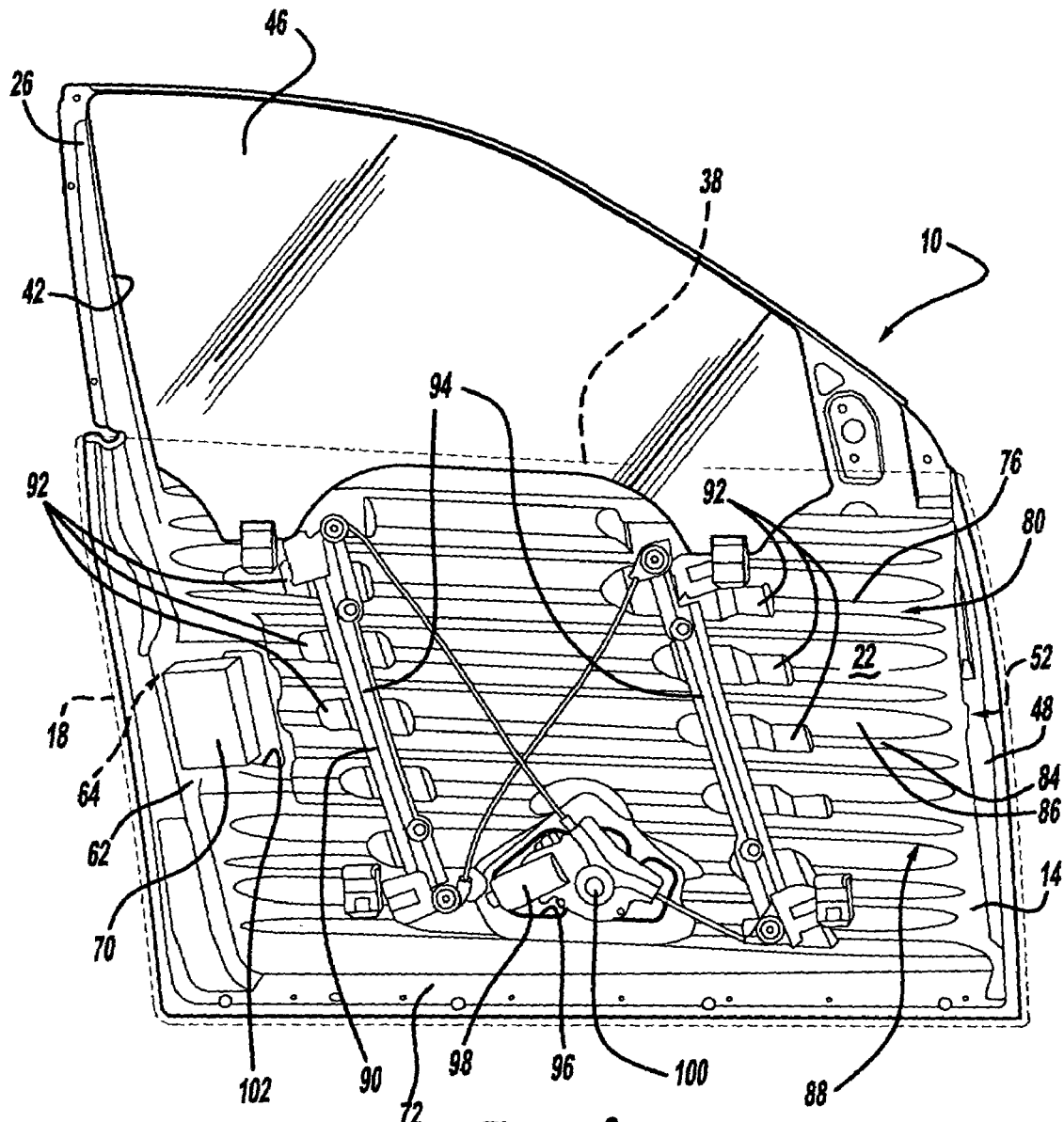
FIG. 2 is a side schematic view of the door of FIG. 1 as viewed from the exterior of a vehicle.

Referring to FIGS. 1 and 2, a vehicle door 10 is schematically depicted. The vehicle door 10 includes an inner panel 14 and an outer panel 18 operatively connected to one another to form a door cavity 22 therebetween. Those skilled in the art will recognize a variety of methods for operatively connecting the inner panel and the outer panel, such as hemming, welding, adhesive bonding, etc.

The inner panel 14 includes a window frame 26 and an edge 30 that forms an inner window sill. The outer panel 18 includes an edge 38 that forms an outer window sill. The window frame 26, the inner sill 30, and the outer sill 38 cooperate to form a window opening 42. However, within the scope of the claimed invention, the door 10 may be frameless. A window 46 is movable between an extended position, as depicted in FIGS. 1 and 2, which corresponds to a closed position in which the window fills the window opening 42, and a retracted position, as depicted in FIG. 3, which corresponds to an open position in which the window is lowered into the door cavity 22. Those skilled in the art will recognize the weatherstrips (not shown) and other components that are employed to guide the movement of the glass window 46 and seal the window 46 when it is in an extended position.

The inner panel 14 includes a forward wall 48 forming a hinge face 52 at which hinges (not shown) are mountable at apertures 56 for pivoting the door 10 between an open and a closed position. Alternatively, those skilled in the art may find it preferable to weld hinges to the hinge face 52. The inner panel also includes a rearward wall 62 forming a lock face 64 and at which a latch 70 is mounted for engaging a striker (not shown) to retain the door 10 in the closed position. The inner panel 14 also includes a lower wall 72. An inboard wall 76 interconnects the forward wall, the rearward wall, and the lower wall, and extends to the inner window sill 30. The forward wall 48, the rearward wall 62, the inboard wall 76, the lower wall 72, and the outer panel 18 cooperate to define the door cavity 22.

The inboard wall 76 is characterized by strengthening corrugations 80. The corrugations in the embodiment depicted are longitudinally-oriented with respect to the vehicle of which the door is a part, and extend substantially from the forward wall 48 to the rearward wall 62, and from the lower wall 72 to the inner window sill 30. However, the corrugations need not be longitudinally-oriented within the scope of the claimed invention. Referring to FIG. 2, the corrugations 80 form a series of longitudinally-extending, alternating, arcuate ridges 84 and furrows 86 on the outboard surface 88 of the inboard wall 76. In the embodiment depicted, the corrugations include six parallel ridges separated by six parallel furrows. A window regulator 90 is mounted to the inner panel 14 inside the door cavity 22 for moving the window 46 between the extended and retracted positions. The ridges 84 are interrupted by a plurality of flattened areas or depressions that form concavities 92. The concavities 92 accommodate passage of the rails 94 of the window regulator 90 and provide clearance for movement of the window 46 to avoid interference with the inner panel 14.

The corrugations are also interrupted by an opening 96 that accommodates a motor 98 for the regulator cable drive 100 and through which the motor 98 is installed in the door cavity, and an opening 102 through which the latch 70 is installed in the door cavity 22. Alternatively, the inner panel may form a cavity open in the inboard direction in which a latch is mounted to eliminate opening 102.

Referring again to FIG. 1, the corrugations 80 result in a series of ridges 84 and furrows 86 on the inboard surface 106 of the inboard wall 76. A ridge 84 on the inboard surface 106 is opposite a furrow on the outboard surface of the inboard wall 76, and a furrow 86 on the inboard surface 106 is opposite a ridge on the outboard surface. The corrugations 80 provide the inner panel 14 with strength to resist deformation resulting from a side impact by transferring impact loads from the door 10 to a vehicle body (not shown) via hinges and the latch 70. The door 10 is characterized by the absence of a separate impact beam between the inner panel 14 and the outer panel 18.

Referring again to FIG. 2, the window regulator 90 and the window 46 are preferably loaded into the cavity 22 between the inner sill and the outer sill in order to minimize the size and quantity of openings in the inner panel 14 that interrupt the corrugations. Flexible cables (not shown) are preferably employed to connect an inside handle (not shown) and an outside handle (not shown) to the latch 70, as opposed to rigid latch rods that may be more difficult to install in the cavity and that may interfere with the contoured inner panel. Electronically controlled door hardware may be desirable to minimize the size and quantity of openings in the inner panel and to provide alternative hardware installation methods.

The inner panel 14 is one-piece. Those skilled in the art will recognize a variety of materials that may be employed to form the inner panel 14, including various metals and plastics. Those skilled in the art will also recognize a variety of forming techniques that may be employed within the scope of the claimed invention to form the contours of inner panel 14, such as, but not limited to, stamping, injection molding, etc. However, a technique that employs fluid pressure, such as quick plastic forming, superplastic forming, and sheet hydroforming, is preferably employed to form the contours of the inner panel 14 so that the inner panel 14 has a more complex shape than is generally achievable with stamping. Holes, apertures, and openings are cut, punched, etc, after the contours, including the corrugations 80, are formed.

Superplastic forming is described in U.S. Pat. No. 5,974,847, issued Nov. 2, 1999 to Saunders, et al, which is hereby incorporated by reference in its entirety. When certain alloy compositions of steel or aluminum are suitably processed (such as with a very fine grain microstructure), they exhibit superplastic behavior at certain elevated temperatures. When deformed at these temperatures, the ductility (or elongation before yield or failure) of these materials exceeds several hundred percent. Such high levels of ductility can enable fabrication of very complex structures in a single sheet of material. An inner panel 14 of the design discussed above can be fabricated in one piece using such techniques.

In addition to various steels and aluminum alloys, other structural materials such as zinc, brass, magnesium, titanium and their alloys have also been reported to exhibit superplastic behavior. Furthermore, certain polymers and reinforced polymer composites have the required ductility to make the inner panel 14. These materials and other metal matrix composites could also be used to make the inner panel 14 of this invention, if desired.

In an example of superplastic forming (SPF), a blank, i.e., a sheet, is tightly clamped at its edges between complementary surfaces of opposing die members. At least one of the die members has a cavity with a forming surface opposite one face of the sheet. The other die opposite the other face of the sheet forms a pressure chamber with the sheet as one wall to contain the working gas for the forming step. The dies and the sheet are heated to a suitable SPF condition for the alloy. For SPF aluminum alloys, this temperature is typically in the range of 400° C. to 550° C. Electric resistance heating elements are located in press platens or sometimes embedded in ceramic or metal pressure plates located between the die members and the platens. A suitable pressurized gas such as argon is gradually introduced into the die chamber on one side of the sheet, and the hot, relatively ductile sheet is stretched at a suitable rate until it is permanently reshaped against the forming surface of the opposite die. The rate of pressurization is controlled so the strain rates induced in the sheet being deformed are consistent with the required elongation for part forming. Suitable strain rates are usually 0.0001 to 0.01 $s^{-1}$. During the deformation of the sheet, gas is vented from the forming die chamber.

The '847 patent provides a method of stretch forming a ductile metal sheet into a complex shape involving significant deformation without excessive thinning of the sheet material and without tearing it. The method is particularly applicable to the stretch forming of superplastic alloys heated to a superplastic forming temperature. In the method, additional material from the initially flat sheet blank is pulled or drawn into the forming cavity for stretch forming. The additional material significantly reduces thinning and tearing in the formed part.

The method contributes to thickness uniformity in an SPF stretch-formed component by utilizing controlled draw-in of sheet metal to the forming chamber prior to application of gas pressure. In an illustrative practice, a preform, similar to a stationary male punch, is placed on the forming press platen opposite the die cavity. An aluminum blank, for example, is placed over the insert and heated to a suitable SPF temperature for the alloy. The die is then moved toward its closed position against the platen. In its closing motion, the die engages the edges of the aluminum sheet. The heated metal is pulled over and around the insert, and draw-in of blank material thus occurs. This results in a greater amount of metal in the die cavity prior to SPF blow forming. The quantity of additional metal can be managed by design of the size, shape and location of the preform on the platen or complementary die member. But the additional metal in the die cavity reduces the amount of strain required and, hence, the amount of thinning to form a desired geometry compared to conventional SPF.

Thus, by the judicious use of a suitable space-occupying metal preform on a die or platen member opposite the forming die, additional metal is easily drawn into the cavity during die closure without significantly increasing the complexity of the tooling. Care is taken in the design of the preform to avoid excessive wrinkling of the drawn-in metal and to maintain a tight gas seal at the periphery of the sheet upon full die closure. The uniformity in thickness of the stretch-formed part is improved. Mass of the formed part can be reduced because the designer does not need to resort to thicker blanks to assure part quality. And, except for the simple preform, there is no increase in the complexity of the SPF tooling.

Quick plastic forming is described in U.S. Pat. No. 6,253,588, issued Jul. 3, 2001 to Rashid, et al, which is hereby incorporated by reference in its entirety. For quick plastic forming, a preferred alloy is Aluminum Alloy 5083 having a typical composition, by weight, of about 4% to 5% magnesium, 0.3 to 1% manganese, a maximum of 0.25% chromium, about 0.1% copper, up to about 0.3% iron, up to about 0.2% silicon, and the balance substantially all aluminum. Generally, the alloy is first hot and then cold rolled to a thickness from about one to about four millimeters.

In the AA5083 alloys, the microstructure is characterized by a principal phase of a solid solution of magnesium in aluminum with well-distributed, finely dispersed particles of intermetallic compounds containing the minor alloying constituents, such as $Al_6Mn$.

Using QPF, large AA5083-type aluminum-magnesium alloy sheet stock may be formed into a complex three-dimensional shape with high elongation regions, like an SPF-formed part, at much higher production rates than those achieved by SPF practices. The magnesium-containing, aluminum sheet is heated to a forming temperature in the range of about 400° C. to 510° C. (750° F. to 950° F.). The forming may often be conducted at a temperature of 460° C. or lower. The heated sheet is stretched against a forming tool and into conformance with the forming surface of the tool by air or gas pressure against the back surface of the sheet. The fluid pressure is preferably increased continuously or stepwise from 0 psi gage at initial pressurization to a final pressure of about 250 to 500 psi (gage pressure, i.e., above ambient pressure) or higher. During the first several seconds up to about, e.g., one minute of increasing pressure application, the sheet accommodates itself on the tool surface. After this initial period of pressurization to initiate stretching of the sheet, the pressure can then be increased at an even faster rate. Depending upon the size and complexity of the panel to be formed, such forming can normally be completed in a period of about two to twelve minutes, considerably faster than realized in superplastic forming. Thus, by working a suitably fine grained, aluminum alloy sheet at significantly lower temperatures and continuously increased, higher gas pressures than typical SPF practices, significantly faster and more practical forming (at least for the automobile industry) times are achieved.

Referring to FIG. 3, the window 46 is depicted in the retracted position, i.e., it is substantially entirely located in the cavity 22 between the inner panel 14 and the outer panel 18. The window 46 has a shape characterized by a contour, i.e., curvature. The inboard wall 76 has a general shape that is characterized by substantially the same contour as the window 46. In other words, the inboard wall 76 approximates the contour of the window. Thus, the inboard wall 76 generally follows the window thereby to minimize the size of the door cavity 22 and result in a door that is thinner than a prior art door. The contour of the inboard wall 76 results in the inboard surface 106 of the inboard wall being generally concave to increase vehicle interior space.

The outer panel 18 is characterized by a contour. It may be desirable for the window 46 and at least a portion of the outer panel 18 to have substantially the same contour to further minimize the thickness of the door 10. Surface 110 of the outer panel 18 forms a portion of the exterior surface of the vehicle door 10.

FIG. 4 (not drawn to scale) schematically depicts the door 10 installed as part of a vehicle 114. The door 10 is shown in a closed position. The door 10 partially defines a passenger space 118.

While the best mode for carrying out the invention has been described in detail, those familiar with the art to which this invention relates will recognize various alternative designs and embodiments for practicing the invention within the scope of the appended claims.

The invention claimed is:

1. A vehicle door comprising:
   a door outer panel forming at least a portion of the exterior surface of the vehicle door; and
   an inner panel operatively connected to the outer panel such that the inner panel and the outer panel form a cavity therebetween; and wherein the inner panel is characterized by strengthening corrugations for resisting deformation as a result of a side impact; and
   a window movable between a retracted and an extended position; and wherein the window is at least partially within the door cavity between the inner panel and the outer panel when in the retracted position.

2. The vehicle door of claim 1, wherein the window has a shape characterized by a contour, and wherein at least a portion of the inner panel has a general shape characterized by substantially the same contour.

3. The vehicle door of claim 1, further comprising a window regulator operatively connected to the window, the window regulator including two rails; wherein the corrugations are interrupted by concavities in which at least a portion of the rails are positioned.

4. The vehicle door of claim 1, wherein the inner panel is characterized by a forward wall, a rearward wall, and an inboard wall extending between the forward wall and the rearward wall; wherein the forward wall, the rearward wall, and the inboard wall cooperate with the outer panel to form the cavity; and wherein the corrugations are on the inboard wall.

5. The vehicle door of claim 4, wherein the inboard surface of the inboard wall is generally concave.

6. The vehicle door of claim 1, wherein the inner panel is formed using a process selected from the group consisting of superplastic farming, quick plastic forming, and sheet hydroforming.

7. A vehicle door comprising:
   an outer panel forming at least a portion of the exterior surface of the door; and
   an inner panel operatively connected to the outer panel to form a cavity therebetween;
   wherein the inner panel includes a forward wall, a rearward wall, and an inboard wall interconnecting the forward wall and the rearward wall;
   wherein the inboard wall is characterized by a plurality of longitudinally-extending corrugations comprised of arcuate ridges and furrows; and
   wherein the inboard wall is generally concave.

* * * * *